Figure 1:
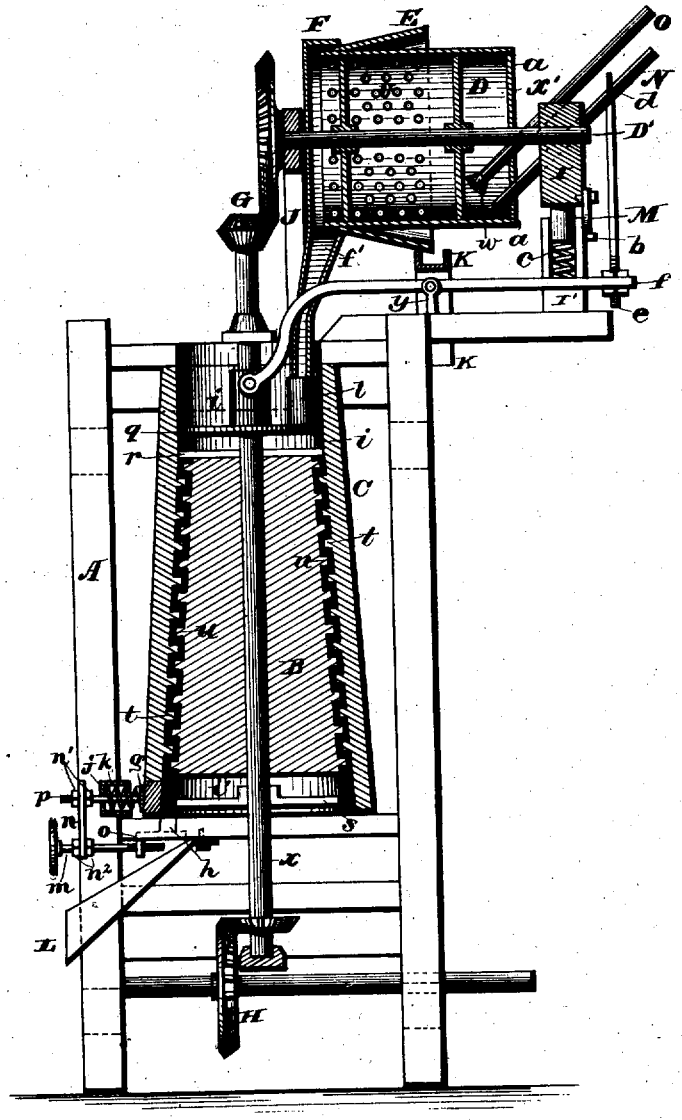

2 Sheets—Sheet 1.

J. CORNWELL.

MACHINE FOR DECORTICATING WHEAT, &c.

No. 9,961. Reissued Dec. 6, 1881.

WITNESSES

E. A. Nottingham

Herman Moran

INVENTOR

Jacob Cornwell,

By Sugett & Sugett

ATTORNEY

2 Sheets—Sheet 2.
J. CORNWELL.
MACHINE FOR DECORTICATING WHEAT, &c.
No. 9,961. Reissued Dec. 6, 1881.
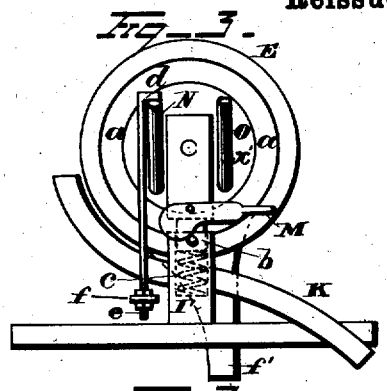
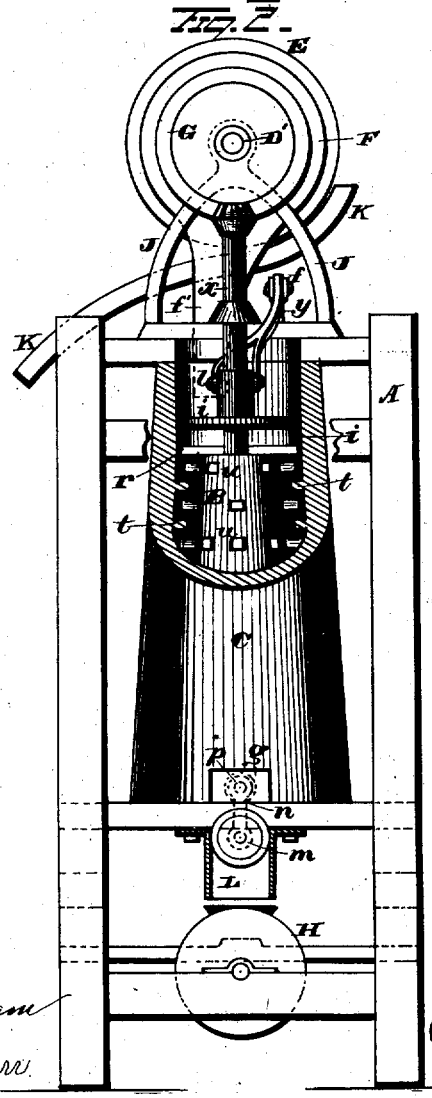
WITNESSES
E. A. Nottingham
Herman Moran
INVENTOR
Jacob Cornwell,
By Dyrett & Dyrett
ATTORNEY

UNITED STATES PATENT OFFICE.

JACOB CORNWELL, OF CADILLAC, MICHIGAN.

MACHINE FOR DECORTICATING WHEAT, &c.

SPECIFICATION forming part of Reissued Letters Patent No. 9,961, dated December 6, 1881.

Original No. 238,489, dated March 8, 1881. Application for reissue filed August 27, 1881.

*To all whom it may concern:*

Be it known that I, JACOB CORNWELL, of Cadillac, in the county of Wexford and State of Michigan, have invented new and useful Improvements in Machines for Decorticating Wheat and other Grain; and I hereby declare the following to be a full, clear, and exact description thereof, which will enable others skilled in the art to which my invention appertains to make and use the same, reference being had to the accompanying drawings, which form a part thereof, and in which—

Figure 1 represents a vertical longitudinal section through the center of the machine. Fig. 2 represents a front elevation of the same, partly in section; and Fig. 3 represents a rear view of that part of the machine used to dampen the grain.

Like letters of reference indicate like parts.

It is well known to all practical millers engaged in the manufacture of wheat-flour that it is impossible to make a strictly pure white flour in consequence of the fine particles of the outer coating of the hull or bran of the berry and the fuzz and fiber attached thereto becoming mixed with the starchy and glutinous portion of the berry during the process of grinding or crushing, and that various machines—such as bolting-reels or middlings-purifiers—are now employed for the purpose of removing such light particles of bran from the chop or meal after the berry has been ground or crushed, or from the middlings after being separated from the superfine flour and bran by bolting, but which do not fully accomplish the desired result.

The object of my invention is to remove from the berry the outer and dark portion of the hull and the fuzz thereto attached prior to grinding or crushing, and so that the remaining portion of the hull shall be less liable to deteriorate the color of the flour, and thereby improve the color and quality of wheat-flour and increase the quantity of first-grade flour; and to that end my invention consists in the construction and combination of the several parts of the machine, as hereinafter more particularly described and claimed.

In the drawings, A represents the frame, which may be made of any desirable material and dimensions that will receive and sustain the operating parts of the machine.

B represents a metal cylinder, preferably in the form of a truncated cone, provided with teeth *u*; and C represents a metal casing surrounding said cylinder and provided with teeth *t*. The length of the cylinder to its casing is such that when mounted in its proper position on its shaft *x* it leaves a space or chamber, *i'*, below its base and a chamber, *i*, above its top.

To the shaft of the cylinder are attached a series of arms or sweeps, *s*, in the chamber *i'*, and in the chamber *i* are in like manner attached a series of arms, *r*. A plate or disk, *q*, is suspended at a short distance above the arms *r* by a lever, *f*, fulcrumed at *y*, and which lever is forked and attached to the pivots of the collar attached to the plate *q*, and by which the plate hangs freely suspended, and is guided in its vertical motion by the shaft of the cylinder B.

To the outer end of the lever *f* is attached a rod, *e*, made adjustable by screws, and to the upper end of said rod is attached a valve, *d*, which opens and closes the tube N.

The upper end of the shaft of the cone is provided with a bevel-gearing, G, preferably made a friction-gear, and on the shaft D' thereof is mounted a hollow cylinder, D, a portion of which—the end nearest the bevel-gearing—is either perforated with holes *v* or else made of wire-cloth. Around this perforated part is placed a conical jacket, E, which is attached to the cylinder D at its outer end. Under the open end of the jacket E is placed a drip-trough, K. The shaft D' is mounted upon the standards J and I, the latter of which is divided at its center, and the lower part thereof, I', is bored out from its top and provided with a coiled spring, *c*, upon which rests the tenon of the part I fitting therein.

To the part I is attached a cam-lever, M, working against a pin, *b*, on I'.

The rear end of the cylinder D is provided with a fixed annular disk, *a*, thus forming a flange around the interior end thereof and an opening, *x'*, through it, through which are passed the tubes N and O. Grain is passed through the tube N into the cylinder D, and water through the pipe O, the end of which may be provided with a rose, *w*. The open end of the cylinder D has a hood, F, covering both it and its conical jacket E, the lower end or side of which is formed into a channel or spout, *f'*, long enough to reach and telescope into the upright tube *l*, attached to the plate *q*, and through which an opening is made into the chamber below.

Through the bottom of the casing or jacket C is an opening, *h*, guarded by a slide-valve, *o*, which may be operated by a screw, *m*. To the screw *m* are attached fixed collars $n^2$, between which works the plate or bar *n*, the upper end of which works between two nuts, *n'*, on the rod *p*, which passes through a box, *j*, and is secured to the movable block *g*, forming a part of the casing C. Within the box *j* is placed a coiled spring, *k*, which presses against the block *g*, the box *j* being fastened to the platform upon which the casing or jacket C rests. Under the opening *h* is placed a spout, L.

The cylinder B is revolved at the desired speed by means of the bevel-gear H, which gives motion to all the other connected parts of the machinery before described.

The cylinder D may, if desired, be made conical, with its wide end entering the head F.

The jacket E need not be attached to and form a part of the drum D, but may surround the lower half thereof, so as to catch the drip through the screen *v*.

The operation of my machine is as follows, viz: Grain is spouted from a bin or hopper through the tube N into the interior of the cylinder D, which falls upon the closed part thereof, and where it is then moistened from the sprinkler *w*, supplied with water from the pipe O. Motion having previously been given to the machinery, the grain, by its own gravity and motion within the cylinder D, will roll forward upon the perforated or screen part *v*, and there drain off all superfluous water, which is caught by the jacket E and conveyed into the conductor or drip-trough K. The grain thus constantly filling in from the spout moves forward until it reaches the end of the cylinder D, from which it falls into the spout *f'*, and passes through the tube *l* into the chamber under the plate *q* on top of the revolving cylinder B, where it is acted upon by the arms or sweeps *r*, which serve to thoroughly mix the moistened grain and tend to loosen the hulls and render it in suitable condition to be acted upon by the cylinder and casing. The grain is forced outward by the arms or sweeps *r* to the inner surface of the casing, when it falls between the cylinder B and its casing C, where, by the attrition given by the motion of the machinery and of the kernels of grain upon each other and upon the teeth *t* and *u*, the grain is decorticated or stripped of its outer hull or dark and woody portion and the fuzz and fiber thereto attached, after which it falls into the chamber *i'*, which soon fills up, and where the berry receives further attrition through the motion of the arms *s*, so as not only to rub off the loose hanging skins, but to entirely clean and polish it, after which it falls through the opening *h* into the spout L. When the valve *o* is not opened sufficiently, so that the grain cannot pass out as fast as it is fed, the grain presses and crowds against the loose block *g* and moves it outward, and which, being connected to the screw *m* by means of the plate or bar *n*, carries the valve *o* out with it, which thus automatically opens the valve *o* and causes the discharge of the surplus accumulated in the chamber *i'*. As the grain passes into the chamber *i* under the plate *q* it soon accumulates and fills it up faster than it passes between the teeth *t u*, and thereby causes the plate to rise and operate the lever *f*, which, in turn, closes the valve *d* in the spout N.

The object of the spring *c* in the post I' is to keep the contact-edges of the bevel-gears G from pressing too heavily, and is so regulated as at all times to press heavily enough, for as the grain accumulates in the cylinder D it depresses the shaft D', and so requires more force to turn it, which is secured by the increased friction on the bevel-gears G. By turning up the cam-lever M the adjacent end of the shaft D' will be raised, thus throwing the gear-wheel mounted upon the other end of the shaft away from its pinion and stopping the movement of the cylinder D and the parts directly connected thereto. The grain then soon accumulates in a pile before the end of the spout N, and stops all further flow, while at the same time the cylinder B may be in motion, thus cleaning out all the grain below. After the wheat has passed through the herein-described decorticating-machine the berry is separated from the bran fuzz and fiber by passing it through any well-known separating or brush machine.

Having fully described my invention, what I claim as new, and desire to secure by Letters Patent, is—

1. In a decorticating-machine, the combination, with a cylinder and casing, said casing having a chamber in its upper end, of sweeps or arms located within the casing and above the cylinder, substantially as set forth.

2. In a decorticating-machine, the combination, with a cylinder and casing, said casing having a grain-receiving chamber in its upper end, of revolving sweeps or arms located within the grain-receiving chamber of the casing and above the cylinder, substantially as set forth.

3. In a decorticating-machine, the combination, with a casing and cylinder, and the casing provided with a grain-receiving chamber at its upper end, of revolving sweeps or arms located within the grain-receiving chamber of the casing, and means for delivering grain into the chamber, substantially as set forth.

4. In a decorticating-machine, the combination, with a grain receiving and moistening cylinder and a decorticating-cylinder and casing provided with a receiving-chamber, of devices, substantially as described, whereby the flow of grain to the moistening-cylinder may be automatically regulated by the pressure of the grain within said receiving-chamber, substantially as set forth.

5. In a decorticating-machine, the combination, with a casing and cylinder, the casing having a grain-receiving chamber at its upper end, of means for moistening the grain and conducting it to the grain-receiving chamber, a vertically-adjustable plate located in said chamber, and devices for connecting the plate and the valve governing the flow of grain to the moistening apparatus, substantially as set forth.

6. In a decorticating-machine, the combination, with a casing and cylinder, of a grain-moistening cylinder, gearing for driving the moistening-cylinder, and means for throwing the friction-gear in and out of engagement, substantially as set forth.

7. In a decorticating-machine, the combination, with a grain-moistening cylinder, perforated throughout a portion of its length and provided with a conical jacket, of a hood and spout located at one end of the cylinder and grain and water tubes arranged to extend into the opposite end of said cylinder, substantially as set forth.

8. In a decorticating-machine, the combination, with the cylinder and casing and a movable block of the latter, of a valve located at the lower end of the casing and devices connected to said movable block, whereby said valve may be opened and closed by the varying pressure of grain in the casing, substantially as set forth.

9. In a decorticating-machine, the combination, with a cylinder and a casing extending above and below said cylinder to form chambers above and below the same, of revolving arms or sweeps located in said chambers, substantially as set forth.

10. In a decorticating-machine, the combination, with the cylinder B, provided with teeth *u* and sweeps *r* and *s*, and mounted upon the shaft *x*, of the casing C, provided with teeth *t*, chambers *i* and *i'*, and opening *h*, provided with valve *o*, attached to and operated by the block *g*, and devices for connecting said valve and block, substantially as and for the purpose specified.

11. In a decorticating-machine, the combination, with the cylinder B, provided with teeth *u*, and mounted upon the revolving shaft *x*, and casing C, provided with teeth *t*, of the plate *q*, lever *f*, adjustable rod *e*, valve *d*, and spout or tube N, substantially as set forth.

12. In a decorticating-machine, the combination, with the cylinder B, provided with teeth *u*, and mounted upon the revolving shaft *x*, casing C, provided with teeth *t*, chamber *i'*, and opening *h*, of the plug or block *g*, spring *k*, rod *p*, connecting-bar *n*, screw *m*, and valve *o*, whereby the attrition and discharge of the grain is automatically regulated, substantially as shown and described.

13. In combination with a decorticating-machine, substantially as shown and described, the hollow and perforated cylinder D and jacket E, mounted upon the revolving shaft D', having bearings in standards J and adjustable standard I, and spouts N, O, and *f'*, substantially as shown and described.

14. In combination with a decorticating-machine, substantially as shown and described, the hollow and perforated cylinder D and jacket E, mounted upon the revolving shaft D', having bearings in standards J and I, bevel-gear G, cam-lever M, and pin *b*, substantially as shown and described.

In testimony whereof I have signed this specification, in the presence of two subscribing witnesses, this 17th day of August, 1881.

JACOB CORNWELL.

Witnesses:
ALBERT L. LAWRENCE,
CHARLES P. WEBSTER.